(12) United States Patent
Jung et al.

(10) Patent No.: US 8,436,113 B2
(45) Date of Patent: May 7, 2013

(54) ETHYLENE ALPHA OLEFIN POLYMER FORMED BY USE OF METALLOCENE CATALYST

(75) Inventors: Hwan Kyu Jung, Chungcheongnam-do (KR); Young Wook Kim, Daejeon (KR); Byoung Tak Yim, Daejeon (KR); Ho Seong Lee, Seoul (KR); Myung Ahn Ok, Daejeon (KR); Jong Sok Hahn, Daejeon (KR); Dong Cheol Shin, Daejeon (KR)

(73) Assignees: SK Innovations Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

(21) Appl. No.: 12/967,235

(22) Filed: Dec. 14, 2010

(65) Prior Publication Data

US 2011/0152475 A1 Jun. 23, 2011

(30) Foreign Application Priority Data

Dec. 21, 2009 (KR) ........................ 10-2009-0127753

(51) Int. Cl.
*C08F 4/6592* (2006.01)
*C08F 4/642* (2006.01)
*C08F 212/08* (2006.01)

(52) U.S. Cl.
USPC ........... 526/160; 526/133; 526/134; 526/165; 526/172; 526/347; 526/943

(58) Field of Classification Search .................. 526/160, 526/165, 172, 348, 943, 133, 134, 347
See application file for complete search history.

(56) References Cited

U.S. PATENT DOCUMENTS

| | | | |
|---|---|---|---|
| 6,239,238 B1 | 5/2001 | Brown et al. | |
| 2006/0111525 A1* | 5/2006 | Hanaoka et al. | 526/127 |
| 2007/0004586 A1* | 1/2007 | Woo et al. | 502/117 |
| 2007/0249490 A1 | 10/2007 | Ok et al. | |
| 2007/0255023 A1* | 11/2007 | Razavi et al. | 526/114 |

FOREIGN PATENT DOCUMENTS

| | | |
|---|---|---|
| EP | 0 420 436 | 4/1991 |
| EP | 0 416 815 | 8/1997 |
| EP | 0 842 939 | 10/2004 |
| WO | 2007/123362 | 11/2007 |

OTHER PUBLICATIONS

Chemical Abstracts Service, Columbus Ohio, U.S., Mu, Ying et al., "Unbridged uni/bi-core . . . olefin polymerization", XP002625864, Database accession No. 2008:703457Abstract of CN 101 195 644 Jun. 11, 2008.
Kim, Tae-Jin et al., "Half-Metallocene . . . Polymerization: Ortho-Substituent", Macromolecules (Washington, D.C., U.S.) 42(18), 6932-6943, 2009.
Itagaki Koji et al., "Ethylene polymerization . . . using group 4 half-metal", Journal of Molecular Catalysis A Chemical, 303(1-2), 102-109, 2009.

* cited by examiner

*Primary Examiner* — Caixia Lu
(74) *Attorney, Agent, or Firm* — Clark & Brody

(57) ABSTRACT

There is provided a method for producing copolymer that is composed of ethylene and alpha-olefin by a solution polymerization, and more specifically, a method for producing copolymer that is composed of ethylene and aromatic monomer as main components by using a transition metal catalyst including a cyclopentadiene derivative, and one or more anionic ligand having aryloxy group in which an aryl derivative is substituted at an ortho-position

10 Claims, No Drawings

ETHYLENE ALPHA OLEFIN POLYMER FORMED BY USE OF METALLOCENE CATALYST

BACKGROUND OF THE INVENTION

1. Field of the Invention

The present invention relates to a method for producing copolymer of ethylene and alpha-olefin.

2. Description of the Related Art

In general, a so-called Ziegler-Natta catalyst, which is composed of a main catalyst component, such as titanium or vanadium compound and a cocatalyst component, such as alkyl aluminum compound, has been used for producing copolymer of ethylene and alpha-olefin. However, Ziegler-Natta catalyst has a high activity for an ethylene homo polymerization, but a poor reactivity for copolymerizing with a high alpha-olefin since it has a non-uniform active catalytic site. Thus, a large dose of alpha-olefin comonomer should be used for producing copolymer of ethylene and alpha-olefin so that there is disadvantage like a catalytic activity is decreased under that condition.

Recently, a so-called metallocene catalyst, which is composed of a metallocene catalyst that is a group IV transition metal in a periodic table, such as titanium, zirconium, hafnium, and the like, and a methylaluminoxane, as a cocatalyst, has been developed. The metallocene catalyst can produce copolymer of ethylene and alpha-olefin having a uniform distribution of compositions and a narrow distribution of molecular weight as compared to the conventional Ziegler-Natta catalyst since it is a homogeneous catalyst having a single active catalytic site.

Meanwhile, a so-called constrained geometry non-metallocene catalyst, in which a transition metal is connected to a ring shape, has been suggested as a catalyst, which has a high catalytic activity and is capable of producing a polymer having a high molecular weight in copolymerization of ethylene and alpha-olefins under solution polymerization condition. European Patent Nos. 0416815 and 0420436 disclose a constrained geometry non-metallocene catalyst, in which one cyclopentadiene ligand is bonded with amide groups in a ring shape, and European Patent No. 0842939 discloses a constrained geometry non-metallocene catalyst, in which phenol-based ligands, which are electron-donating compounds, are bonded with cyclopentadiene ligands in a ring shape. However, the above constrained geometry non-metallocene catalysts has a significant improved reactivity with a high alpha-olefins due to a decreased sterical hinderance effect of the catalyst itself. However, the above constrained geometry non-metallocene catalysts are very difficult to use commercially because the synthesis of the catalyst is very complicated and the yield of a process of cyclization along the transition metal with ligands during the synthesis of the constrained geometry non-metallocene catalyst is very low.

Meanwhile, U.S. Pat. No. 6,239,238 discloses a non-metallocene catalyst, which is not a constrained geometry catalyst. It can be seen in this patent document that a single-site catalyst, produced using at least one phosphine-imine compound as a ligand, exhibits a high conversion of ethylene in copolymerization of ethylene and alpha-olefin under a high temperature solution polymerization condition at above 140° C. However, the non-metallocene catalysts are not sufficient catalyst for producing copolymer of ethylene and high alpha-olefin since they have very low reactivity with the high alpha-olefin like the metallocene catalyst.

SUMMARY OF THE INVENTION

An aspect of the present invention provides a method for producing copolymer of ethylene and alpha-olefin, in which a catalytic activity can be maintained by using a catalyst composition of single active site having a high activity under a solution polymerization state of a high temperature.

An aspect of the present invention also provides a method for producing copolymer of ethylene and alpha-olefin having 0.1 to 90 wt % of aromatic monomer content, in which the method includes a solution polymerization of ethylene and at least one alpha-olefinic comonomer under presence of C3 to C20 organic solvent and a catalyst composition including a transition metal catalyst represented by the following Formula 1 in a single reactor, or series or parallel 2nd continuous reactors:

[Formula 1]

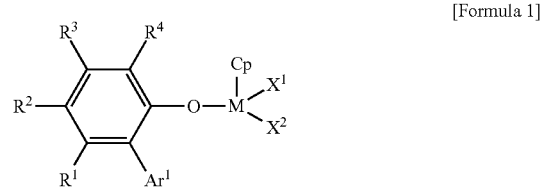

where,

M is a group IV transition metal in a periodic table;

Cp is a cyclopentadienyl ring, or a fused ring including a cyclopentadienyl ring that can form an η 5-bond along with a central metal, M, and the cyclopentadienyl ring or the fused ring including the cyclopentadienyl ring may be further substituted with at least one selected from the group consisting of (C1-C20) alkyl, (C6-C30) aryl, (C2-C20) alkenyl and (C6-C30) ar (C1-C20) alkyl;

$R^1$ to $R^4$ are each independently hydrogen atom, halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio or nitro, or the $R^1$ to $R^4$ may form an aliphatic ring, and monocyclic or polycyclic aromatic ring by binding with (C3-C12) alkenylene or (C3-C12) alkylene with or without the fused ring along with an adjacent substituent;

$Ar^1$ is (C6-C30) aryl, or (C3-C30) heteroaryl including at least one selected from the group consisting of N, O and S;

$X^1$ and $X^2$ are each independently halogen atom, (C1-C20) alkyl, (C3-C20) cycloalkyl, (C6-C30) ar (C1-C20) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) artylthio or

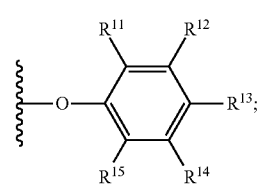

$R^{11}$ to $R^{15}$ are each independently hydrogen atom, halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio or nitro, or the $R^{11}$ to $R^{15}$ may form an aliphatic ring, and monocyclic or polycyclic aromatic ring by binding with (C3-C12) alkenylene or (C3-C12) alkylene with or without the fused ring along with an adjacent substituent; and Alkyl, aryl, cycloalkyl, aralkyl, alkoxy, alkylsiloxy, arylsiloxy, alkylamino, arylamino, alkylthio, arylthio of the $R^1$ to $R^4$, $R^{11}$ to $R^{15}$, and $X^1$ and $X^2$; the rings that are formed by binding $R^1$ to $R^4$ or $R^{11}$ to $R^{15}$ and the adjacent substituents with alkylene or alkenylene; and aryl or hetero aryl of the $Ar^1$ may be further substituted with at least one selected from the group consisting of halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) acylamino, (C1-C20) alkylthio, (C6-C30) arylthio, nitro and hydroxy.

According to an aspect of the present invention, there is provided a method for producing copolymer of ethylene and alpha-olefin, in which the method can secure a high reaction efficiency, and can maintain a high productivity even in polymerization of high temperature as compared to the existed method for producing copolymer of ethylene and alpha-olefin, so that the above method can be used to economically produce copolymer of ethylene and alpha-olefin.

DETAILED DESCRIPTION OF THE PREFERRED EMBODIMENT

The catalyst composition used for the present invention includes a transition metal catalyst represented by the following Formula 1.

The compound represented by the following Formula 1 includes a cyclopentadiene derivative, and one or more aryl oxide ligand having an aryl derivative thereof at an ortho-position thereof around a transition metal, the ligands not being crosslinked to each other; is a group IV transition metal catalyst:

[Formula 1]

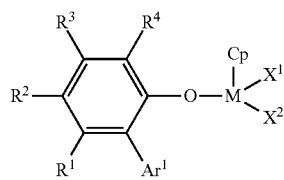

where

M that is a central metal in the transition metal catalyst represented by the above Formula 1 is a group IV transition metal in a periodic table, and is preferably titanium, zirconium, or hafnium. In addition, the Cp is a cyclopentadienyl ring, or a fused ring including a cyclopentadienyl ring that can form an η 5-bond along with a central metal, M, and the cyclopentadienyl ring or the fused ring including the cyclopentadienyl ring may be further substituted with at least one selected from the group consisting of (C1-C20) alkyl, (C6-C30) aryl, (C2-C20) alkenyl and (C6-C30) ar (C1-C20) alkyl. Specifically, examples of Cp may include cyclopentadienyl, methylcyclopentadienyl, dimethylcyclopentadienyl, tetramethylcyclopentadienyl, pentamethylcyclopentadienyl, butylcyclopentadienyl, sec-butylcyclopentadienyl, tert-butylmethylcyclopentadienyl, trimethylsilylcyclopentadienyl, indenyl, methylindenyl, dimethylindenyl, ethylindenyl, isopropylindenyl, fluorenyl, methylfluorenyl, dimethylfluorenyl, ethylfluorenyl, isopropylflorenyl, and the like.

$R^1$ to $R^4$ on an arylphenoxide ligand represented by the above Formula 1 are each independently hydrogen atom, halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio or nitro, or the $R^1$ to $R^4$ may form an aliphatic ring, and monocyclic or polycyclic aromatic ring by binding with (C3-C12) alkenylene or (C3-C12) alkylene with or without the fused ring along with an adjacent substituent;

$Ar^1$ is (C6-C30) aryl, or (C3-C30) heteroaryl including at least one selected from the group consisting of N, O and S;

$X^1$ and $X^2$ are each independently halogen atom, (C1-C20) alkyl, (C3-C20) cycloalkyl, (C6-C30) ar (C1-C20) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) artylthio or

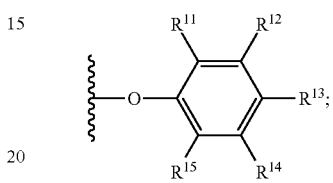

$R^{11}$ to $R^{15}$ are each independently hydrogen atom, halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio or nitro, or the $R^{11}$ to $R^{15}$ may form an aliphatic ring, and monocyclic or polycyclic aromatic ring by binding with (C3-C12) alkenylene or (C3-C12) alkylene with or without the fused ring along with an adjacent substituent; and Alkyl, aryl, cycloalkyl, aralkyl, alkoxy, alkylsiloxy, arylsiloxy, alkylamino, arylamino, alkylthio, arylthio of the $R^1$ to $R^4$, $R^{11}$ to $R^{15}$, and $X^1$ and $X^2$; the rings that are formed by binding $R^1$ to $R^4$ or $R^{11}$ to $R^{15}$ and the adjacent substituents with alkylene or alkenylene; and aryl or hetero aryl of the $Ar^1$ may be further substituted with at least one selected from the group consisting of halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio, nitro and hydroxy.

Examples of the halogen atom may include fluorine, chlorine, bromine, and iodine atoms; examples of the (C1-C20) alkyl or (C3-C20) cycloalkyl may include methyl, ethyl, n-propyl, isopropyl, n-butyl, sec-butyl, tert-butyl, n-pentyl, neopentyl, n-hexyl, n-octyl, n-decyl, n-dodecyl, n-pentadecyl or n-eicosyl, and preferably, methyl, ethyl, isopropyl and tert-butyl; examples of (C6-C30) aryl may include phenyl, naphthyl, anthracenyl and fluorenyl; examples of (C6-C30) ar (C1-C20) alkyl group may include benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenyl)methyl, (4,6-dimethylphenyl)methyl, (2,3,4-trimethylphenyl)methyl, (2,3,5-trimethylphenyl)methyl, (2,3,6-trimethylphenyl)methyl, (3,4,5-trimethylphenyl)methyl, (2,4,6-trimethylphenyl)methyl, (2,3,4,5-tetramethylphenyl)methyl, (2,3,4,6-tetramethylphenyl)methyl, (2,3,5,6-tetramethylphenyl)methyl, (pentamethylphenyl)methyl, (ethylphenyl)methyl, (n-propylphenyl)methyl, (isopropylphenyl)methyl, (n-butylphenyl)methyl, (sec-butylphenyl)methyl, (n-tetradecylphenyl)methyl, triphenylmethyl, naphthylmethyl and anthracenylmethyl, and preferably, benzyl and triphenylmethyl; examples of (C1-C20) alkoxy may include methoxy, ethoxy, n-propoxy, isopropoxy, n-butoxy, sec-butoxy, tert-butoxy, n-pentoxy, neopentoxy, n-hexoxy, n-octoxy, n-dodecoxy, n-pentadecoxy and n-eicosoxy, and preferably, methoxy, ethoxy, isopropoxy and tert-butoxy; examples of (C3-C20) alkylsiloxy or (C6-C30) arylsiloxy may include trimethylsiloxy, triethylsiloxy, tri-n-propylsiloxy, triisopropylsiloxy, tri-n-butylsiloxy, tri-sec-butylsiloxy, tri-tert-butylsiloxy, tri-isobutylsiloxy, tert-butyldimethylsiloxy, tri-n-pentylsiloxy, tri-n-hexylsiloxy, tricyclohexylsiloxy, phenylsiloxy, diphenylsiloxy and naphthylsiloxy, and preferably, trimethylsiloxy, tert-butyldimethylsiloxy and phenylsiloxy. In addition, examples of (C1-C20) alkylamino or (C6-C30) arylamino may include dimethylamino, diethylamino, di-n-propylamino, diisopropylamino, di-n-butylamino, di-sec-butylamino, di-tert-butylamino, diisobutylamino, tert-butylisopropylamino, di-n-hexylamino, di-n-octylamino, di-n-decylamino, diphenylamino, dibenzylamino, methylethylamino, methylphenylamino and benzylhexylamino, and preferably, dimethylamino, diethylamino and diphenylamino, and examples of (C1-C20) alkylthio or (C6-C30) may include methylthio, ethylthio, isopropylthio, phenylthio and naphthylthio.

Specifically, examples of the above Formula 1 may be selected from the following Formulae:

[Formula 1-1]

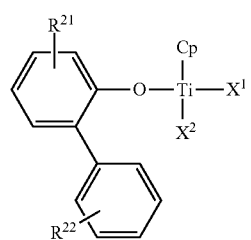

[Formula 1-2]

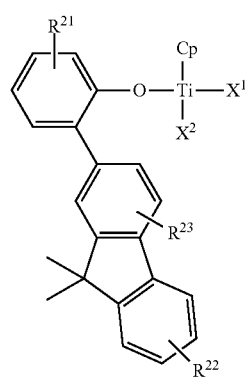

[Formula 1-3]

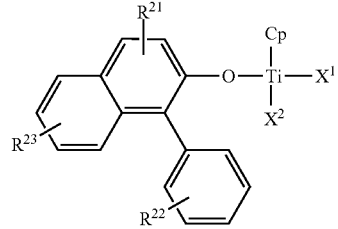

[Formula 1-4]

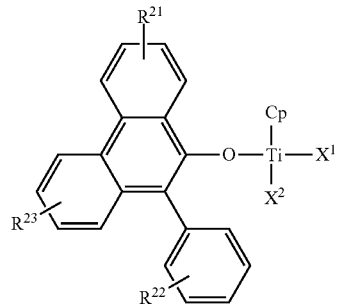

[Formula 1-5]

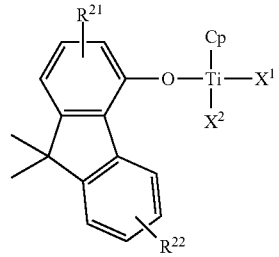

[Formula 1-6]

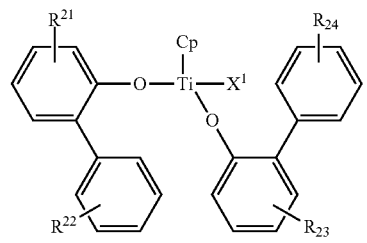

[Formula 1-7]

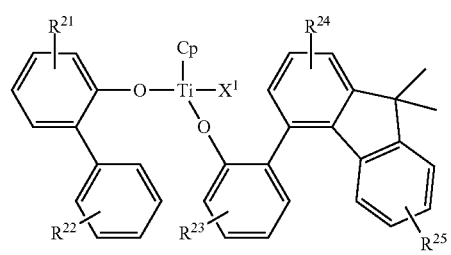

[Formula 1-8]

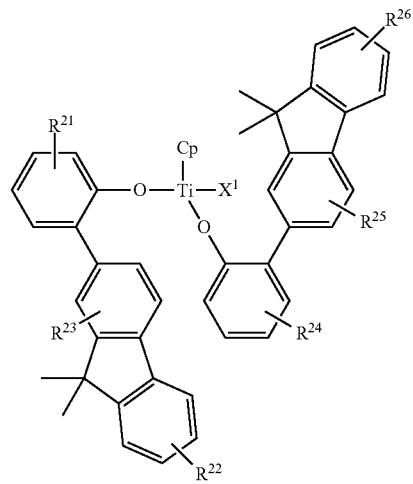

[Formula 1-9]

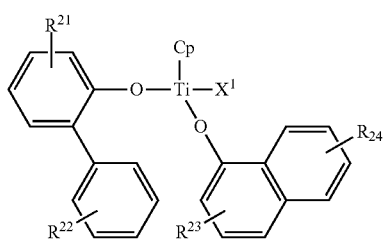

[Formula 1-10]

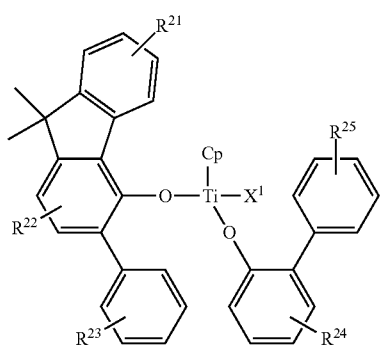

[Formula 1-11]

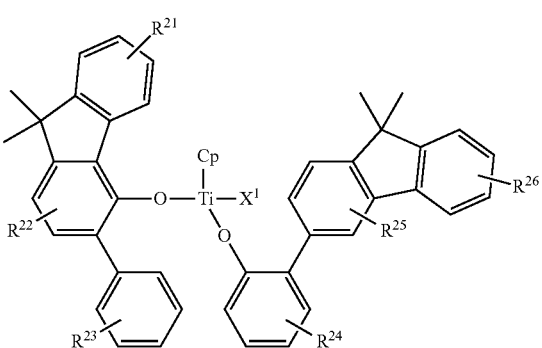

[Formula 1-12]

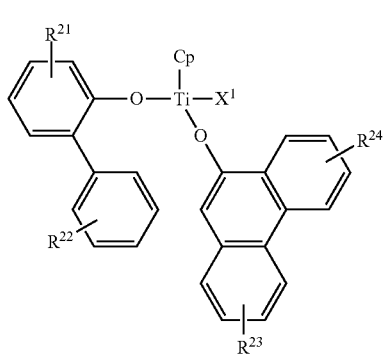

[Formula 1-13]

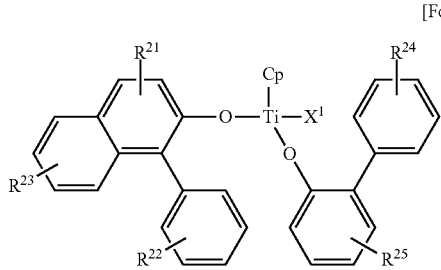

[Formula 1-14]

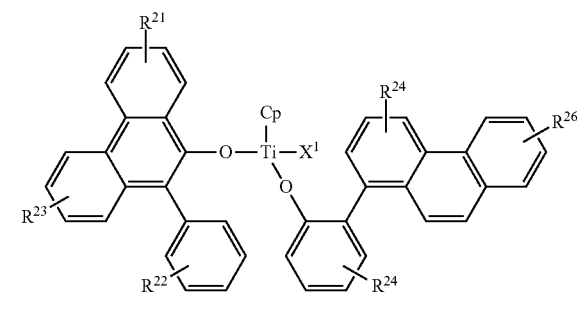

where $R^{21}$ to $R^{26}$ are each independently hydrogen atom, halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio or nitro, or the $R^{21}$ to $R^{26}$ may form an aliphatic ring, and monocyclic or polycyclic aromatic ring by binding with (C3-C12) alkenylene or (C3-C12) alkylene with or without the fused ring along with an adjacent substituent; alkyl, aryl, cycloalkyl, aralkyl, alkoxy, alkylsiloxy, arylsiloxy, alkylamino, arylamino, alkylthio, arylthio of the $R^{21}$ to $R^{26}$ may be further substituted with at least one selected from the group consisting of halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio, nitro and hydroxy; Cp is a cyclopentadienyl ring, or a fused ring including a cyclopentadienyl ring that can form an η 5-bond along with a central metal, Ti, and the cyclopentadienyl ring or the fused ring including the cyclopentadienyl ring may be further substituted with at least one selected from the group consisting of (C1-C20) alkyl, (C6-C30) aryl, (C2-C20) alkenyl and (C6-C30) ar (C1-C20) alkyl; and $X^1$ and $X^2$ are methyl or Cl.

More specifically, the transition metal catalyst may be selected from the following Formulae:

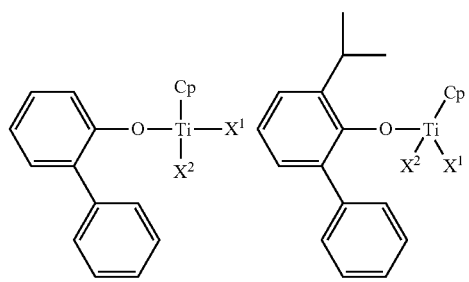

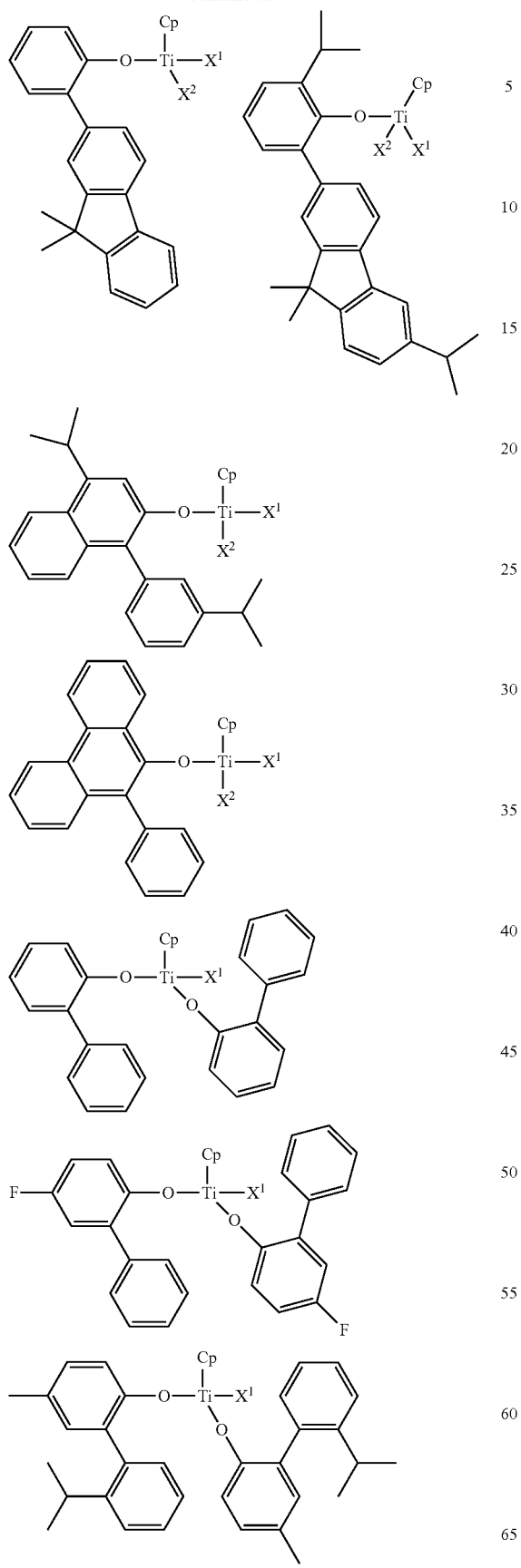

-continued

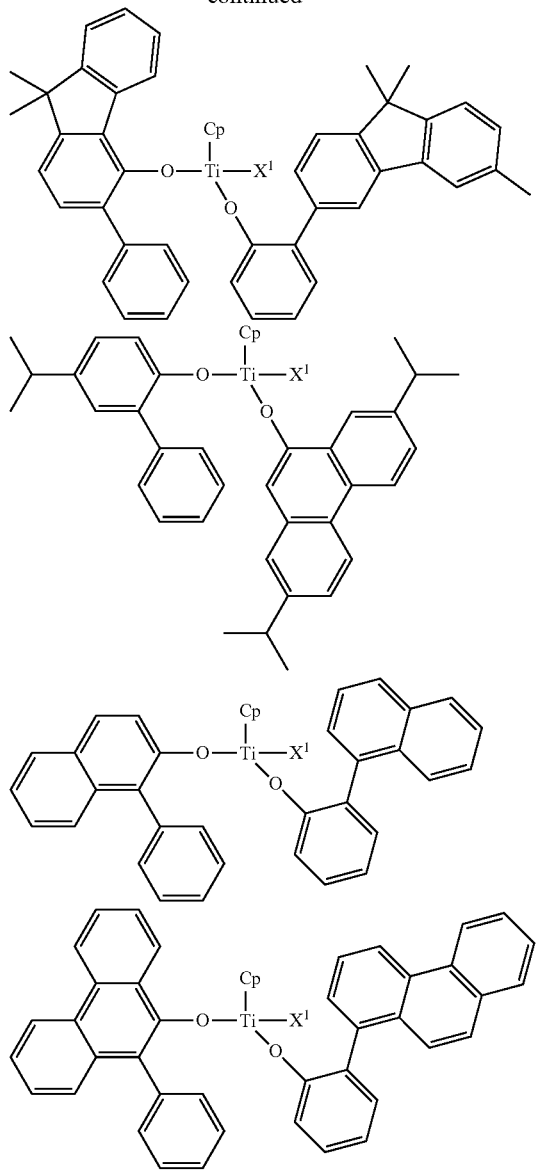

where

Cp is a cyclopentadienyl ring, or a fused ring including a cyclopentadienyl ring that can form an η 5-bond along with a central metal, M, and the cyclopentadienyl ring or the fused ring including the cyclopentadienyl ring may be further substituted with at least one selected from the group consisting of (C1-C20) alkyl, (C6-C30) aryl, (C2-C20) alkenyl and (C6-C30) ar (C1-C20) alkyl; and $X^1$ and $X^2$ are methyl or Cl.

The transition metal catalyst may more preferably include at least one selected from the group consisting of bis(2-phenylphenoxy)(pentamethylcyclopentadienyl)titatnium(IV) methyl, (dichloro) (pentamethylcyclopentadienyl)(2-(9,9'-dimethylfluorene-2'-yl)phenoxy)titanium(IV) and (chloro) (pentamethylcyclopentadienyl)(bis(2-(9,9'-dimethylfluorene-2'-yl)phenoxy))titanium(IV).

Meanwhile, in order to use the transition metal catalyst, represented by the above Formula 1, as an active catalyst component which is used to produce an ethylene polymerization, an X ligand is extracted from a transition metal complex to convert the central metal into cations, and aluminum compound or boron compound which are capable of acting as opposite ions having weak bonding strength, that is, anions, are used along with a cocatalyst. At this point, the organic aluminum compound is used for removing a small amount of polar compound that acts as a catalyst poison in a reaction solvent, but can act as an alkylating agent when the X ligand is a halogen.

A boron compound which can be used as a cocatalyst in the present invention may be selected from compounds represented by the following Formula 2, Formula 3 or Formula 4, as disclosed in U.S. Pat. No. 5,198,401.

$B(R^{31})_3$ [Formula 2]

$[R^{32}]^+[B(R^{31})_4]^-$ [Formula 3]

$[(R^{33})_qZH]^+[B(R^{31})_4]^-$ [Formula 4]

where,

B is a boron atom; $R^{31}$ is phenyl, and the phenyl may be further substituted with 3 to 5 substituent groups selected from the group consisting of fluorine atom, (C1-C20) alkyl which is substituted or unsubstituted with fluorine atom and (C1-C20) alkyoxy which is substituted or unsubstituted with the fluorine atom; $R^{32}$ is (C5-C7) cycloalkyl radical or (C1-C20) alkyl (C6-C20) aryl radical, (C6-C30) ar (C1-C20) alkyl radical, such as triphenylmethyl radical; Z is nitrogen or phosphorus atom; $R^{33}$ is (C1-C20) alkyl radical or anilinium radical which is substituted with two (C1-C4) alkyl groups along with nitrogen atom; and q is an integer of 2 or 3.

Preferably, examples of the boron-based cocatalyst may include tris(pentafluorophenyl)borane, tris(2,3,5,6-tetrafluorophenyl)borane, tris(2,3,4,5-tetrafluorophenyl)borane, tris (3,4,5-trifluorophenyl)borane, tris(2,3,4-trifluorophenyl)borane, phenylbis(pentafluorophenyl)borane, tetrakis (pentafluorophenyl)borate, tetrakis(2,3,5,6-tetrafluorophenyl)borate, tetrakis(2,3,4,5-tetrafluorophenyl) borate, tetrakis(3,4,5-tetrafluorophenyl)borate, tetrakis(2,2, 4-trifluorophenyl)borate, phenyl bis(pentafluorophenyl) borate or tetrakis(3,5-bistrifluoromethylphenyl)borate. Further, combination examples of the boron-based cocatalyst may include ferrocenium tetrakis(pentafluorophenyl)borate, 1,1'-dimethylferrocenium tetrakis(pentafluorophenyl)borate, triphenylmethyl tetrakis(pentafluorophenyl)borate, triphenylmethyl tetrakis(3,5-bistrifluoromethylphenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl) borate, N,N-dimethylanilinium tetrakis(pentafluorophenyl) borate, N,N-diethylanilinium tetrakis(pentafluorophenyl) borate, N,N-2,4,6-pentamethylanilinium tetrakis (pentafluorophenyl)borate, N,N-dimethylanilinium tetrakis (3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri (methylphenyl)phosphonium tetrakis(pentafluorophenyl)borate, or tri(dimethylphenyl)phosphonium tetrakis(pentafluorophenyl)borate, and most preferably, N,N-dimethylanilinium tetrakis(pentafluorophenyl)borate, triphenylmethylinium tetrakis(pentafluorophenyl)borate or tris(pentafluoro)borane. In a catalyst system using the boron-based cocatalyst, the molar ratio of the central metal M to the boron atom may be preferably 1:0.1~50, and more preferably, 1:0.5~15.

The aluminum compound that can be used for one embodiment of the present invention may include aluminoxane compounds represented by the following Formula 5 or Formula 6, organic aluminum compound represented by the following Formula 7, or organic aluminum hydrocarbyloxide compounds represented by the following Formula 8 or Formula 9, and the like:

$(-Al(R^{41})-O-)_m$ [Formula 5]

$(R^{41})_2Al-(-O(R^{41})-)_p-(R^{41})_2$ [Formula 6]

$(R^{42})_rAl(E)_{3-r}$ [Formula 7]

$(R^{43})_2AlOR^{44}$ [Formula 8]

$R^{43}Al(OR^{44})_2$ [Formula 9]

where,
$R^{41}$ is linear or nonlinear (C1-C20) alkyl, and preferably methyl or isobutyl; m and p are integers from 5 to 20; $R^{42}$ and $R^{43}$ are (C1-C20) alkyl; E is hydrogen atom or halogen atom; r is an integer from 1 to 3; and $R^{44}$ may be selected from the group consisting of (C1-C20) alkyl or (C6-C30) aryl.

Specifically, examples that can be used as the aluminum compound may include methyl aluminoxane, modified methyl aluminoxane and tetraisobutylaluminoxane, as an aluminoxane compound; examples of the organic aluminum compound may include trialkylaluminum, such as trimethylaluminum, triethylaluminum, tripropylaluminum, triisobutylaluminum and trihexylaluminum; dialkylaluminum chloride, such as dimethylaluminum chloride, diethylaluminum chloride, dipropylaluminum chloride, diisobutylaluminum chloride and dihexylaluminum chloride; alkylaluminum dichloride, such as methylaluminum dichloride, ethylaluminum dichloride, propylaluminum dichloride, isobutylaluminum dichloride and hexylaluminum dichloride; and dialkylaluminum hydride, such as dimethylaluminum hydride, diethylaluminum hydride, dipropylaluminum hydride, diisobutylaluminum hydride and dihexylaluminum hydride. Here, trialkylaluminum is preferable, and triethylaluminum and triisobutylaluminum are more preferable. In connection with this, the used amount of the aluminum compound may be preferably 1:1 to 1:2,000, and more preferably 1:5 to 1:1,000 in the molar ratio of the aluminum atom related to the central metal M of the compound represented by the above Formula 1.

In connection with this, the used amount of the compound represented by Formula 1, the boron compound and the aluminum compound may be 1:0.1~50:1~1,000, and more preferably, 1:0.5~15:5~500 in the molar ratio of the central metal M:the boron atom:the aluminum atom.

In a method of producing copolymer of ethylene and alpha-olefin using the transition metal catalyst system according to another aspect of the present invention, the transition metal catalyst, the cocatalyst, and ethylene and at least one alpha-olefinic comonomer come into contact with each other in the presence of a predetermined organic solvent. In this case, at least one reactor may be used. When using more than two reactors in a series or parallel, the physically and chemically mixture of the copolymers that have different molecular weights and densities to each other may be obtained according to the reaction fractions under varying the conditions of the reactors.

The preferable organic solvent which can be used in the method includes hydrocarbons of 3 to 20 carbon atoms, and specific examples of the organic solvent may include butane, isobutane, pentane, hexane, heptane, octane, isooctane, nonane, decane, dodecane, cyclohexane, methylcyclohexane, benzene, toluene, xylene and the like. In some cases, the mixture of more than two organic solvents may be used.

The alpha-olefinic comonomer that can be used along with ethylene in the present invention may be at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene, 1-iotocene, norbonene, norbonadiene, ethylidenenorbonene, phenylnorbonene, vinylnorbonene, dicyclopentadiene, 1,4-butadiene, 1,5-pentadiene, 1,6-pentadiene, 1,6-hexadiene, styrene, alpha-methylstyrene, p-methylstyrene, divinylbenzene and 3-chloromethylstyrene, and most preferably may use propylene along with styrene.

The polymerization may be carried out at the pressure and temperature, in which the reactant in the reactors can be maintained in a solution state. For the polymerization, it can be effective that the pressure in the polymerization reactors may be 1 to 500 atm., and preferably 5 to 200 atm., and the temperature of the polymerization may be 30 to 300° C., and preferably 40 to 250° C., but are not limited thereto.

Generally, when polymerizing at a high temperature, it is difficult to obtain a polymer having desired physical properties since the modification or deterioration of a catalyst may be occurred according to the increase of temperature thereby decreasing the activity of catalyst. However, when producing copolymer of ethylene and alpha-olefin according to the present invention, the catalyst stability may be maintained within the range of 40 to 250° C., and most preferably 80 to 150° C.

For copolymer of ethylene and alpha-olefin produced according to the present invention, the content of ethylene may be 0.1 to 90 wt %, and preferably 10 to 85 wt %, and the content of aromatic monomer may be 0.1 to 90 wt %, and preferably 1 to 60 wt %. Above this, the aliphatic monomer content may be less than 90 wt %, and preferably 10 to 85 wt %. In addition, the weight average molecular weight (Mw) of copolymer of ethylene and alpha-olefin obtained may be within the range of 60,000 to 600,000, and a molecular weight distribution (Mw/Mn) may be 1.0 to 5.0.

A better understanding of the present invention may be obtained through the following examples which are set forth to illustrate, but are not to be construed as the limit of the present invention.

The copolymer produced according to the method of the present invention exhibits various molecular weights according to the production conditions of polymer. The molecular weight and the molecular weight distribution were measured through a gel chromatography that is composed of three-step mixed column. The solvent that is used at the above process was 1,2,4-trichlorobenzene and the measurement temperature was 120° C. A specimen in a film state was prepared by using a press specimen machine, and the quantification ratio of ethylene and propylene among the specimen was measured by using an infrared spectrometer. In addition, the copolymer sample was dissolved in chloroform that is substituted by heavy hydrogen, and then the styrene content in the copolymer was measured by using a nuclear magnetic resonance spectroscopy. The conversion ratio of styrene monomer was calculated from the styrene content in the measured copolymer.

EXAMPLE 1

1.4 g of modified methylaluminoxane-7 (manufactured by Akzo Novel, mMAO-7) was put into a stainless steel reactor having a volume of 2 L. And then the weight ratio of propylene/ethylene was adjusted at 0.76 to an initial composition, added to the reactor up to 5 kg/cm² of the pressure in the reactor, and then the reactor was heated to a temperature of 80° C. 5 uM of bis(2-phenylphenoxy)(pentamethylcyclopentadienyl)titanium(IV) and 50 uM of triphenylmethylinium tetrakis(pentafluorophenyl)borate (99%, Boulder Scientific) were sequentially added thereto to start the reaction. Subsequently, ethylene and propylene were continuously supplied according to the initial composition for maintaining 5 kg/cm² of the pressure in the reactor when processing the reaction. As soon as the reaction began, the temperature of the reaction was increased to above 20° C. due to an exothermic reaction, and then after 25 minutes, oxygen was injected to finish the reaction. The polymerized solution was immersed in a sufficient acetone solution to recover, and then the separated reaction product was dried in a vacuum oven at a room temperature for 12 hours to produce 45 g of polymer. The polymer had a weight average molecular weight of 100,000 g/mol and a molecular weight distribution of 2.5. In addition, the ethylene content of the polymer was 63 wt %, as determined through the infrared spectroscopy analysis.

EXAMPLE 2

Except for using 20 g of styrene monomer, the same method as that of Example 1 was used to produce 73 g of polymer. The polymer had a weight average molecular weight of 140,000 g/mol and a molecular weight distribution of 2.3. In addition, the ethylene content of the polymer was 51 wt %, as determined through the infrared spectroscopy analysis, and the styrene content was 20 wt %, as determined through the nuclear magnetic resonance spectroscopy analysis.

EXAMPLE 3

Except for using 120° C. as a starting temperature of the polymerization, the same method as that of Example 2 was used to produce 75 g of polymer. The polymer had a weight average molecular weight of 114,000 g/mol and a molecular weight distribution of 2.3. In addition, the ethylene content of the polymer was 43 wt %, as determined through the infrared spectroscopy analysis, and the styrene content was 19 wt %, as determined through the nuclear magnetic resonance spectroscopy analysis.

EXAMPLE 4

Except for using (dichloro) (pentamethylcyclopentadienyl)(2-9',9"-dimethylfluorene-2'-yl)phenoxy)titanium(IV) instead of bis(2-phenylphenoxy) (pentamethylcyclopentadienyl)titanium(IV)methyl as a main catalyst, the same method as that of Example 2 was used to produce 73 g of polymer. The polymer had a weight average molecular weight of 135,000 g/mol and a molecular weight distribution of 2.5. In addition, the ethylene content of the polymer was 49 wt %, as determined through the infrared spectroscopy analysis, and the styrene content was 19 wt %, as determined through the nuclear magnetic resonance spectroscopy analysis.

EXAMPLE 5

Except for using (chloro) (pentamethylcyclopentadienyl)(bis(2-(9,9'-dimethylfluorene-2'-yl)phenoxy))titanium(IV) as a main catalyst, the same method as that of Example 2 was used to produce 73 g of polymer. The polymer had a weight average molecular weight of 121,000 g/mol and a molecular weight distribution of 2.7. In addition, the ethylene content of the polymer was 50 wt %, as determined through the infrared spectroscopy analysis, and the styrene content was 18 wt %, as determined through the nuclear magnetic resonance spectroscopy analysis.

COMPARATIVE EXAMPLE 1

1 L of n-hexane was put into a stainless steel reactor having a volume of 2 L, and then 10 g of styrene monomer and 400 umol of modified ethylaluminumsesquichloride (manufactured by Sigma Aldrich, EASC) were put into the stainless steel reactor having a volume of 2 L. And then the weight ratio of propylene/ethylene was adjusted at 4.60 to an initial composition, added to the reactor up to 5 kg/cm² of the pressure in the reactor, and then the reactor was heated to a temperature of 50° C. 127 uM of vanadiumtrichloride (manufactured by Sigma Aldrich) was added thereto to start the reaction. Subsequently, ethylene and propylene were continuously supplied according to the initial composition for maintaining 5 kg/cm² of the pressure in the reactor when processing the reaction. As soon as the reaction began, the temperature of the reaction was increased to above 7° C. due to an exothermic reaction, and then after 25 minutes, oxygen was injected to finish the reaction. The polymerized solution was immersed in a sufficient acetone solution to recover, and then the separated reaction product was dried in a vacuum oven at a room temperature for 12 hours to produce 16 g of polymer. The polymer had a weight average molecular weight of 80,000 g/mol and a molecular weight distribution of 3.5. In addition, the ethylene content of the polymer was 66 wt %, as determined through the infrared spectroscopy analysis, and the styrene content was 0.1 wt %.

TABLE 1

| | Monomer Composition | | Polymer | |
| --- | --- | --- | --- | --- |
| No. | C3/C2 Weight Ratio | Injection Amount of Styrene Monomer (g) | C3/C2 Weight Ratio | Conversion Ratio of Styrene Monomer (%) |
| Com. Example 1 | 4.6 | 10 | 0.48 | 12 |
| Example 1 | 0.76 | — | 0.59 | — |
| Example 2 | 0.76 | 20 | 0.57 | 90 |
| Example 3 | 0.76 | 20 | 0.53 | 87 |
| Example 4 | 0.76 | 20 | 0.65 | 89 |
| Example 5 | 0.76 | 20 | 0.64 | 88 |

What is claimed is:

1. A method for producing copolymer of ethylene, propylene, and styrene comprising: a solution polymerizing ethylene, propylene, and styrene under presence of C3 to C20 organic solvent and a catalyst composition including a transition metal catalyst represented by the following Formula 1 in a single reactor, or series or parallel 2nd continuous reactors:

[Formula 1]

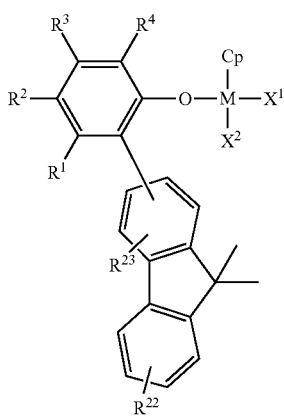

where,

M is a group IV transition metal in a periodic table;

Cp is a cyclopentadienyl ring, or a cyclopentadienyl containing fused ring that can form an η 5 -bond along with a central metal M, and the cyclopentadienyl ring or the cyclopentadienyl containing fused ring is optionally further substituted with at least one selected from the group consisting of (C1-C20) alkyl, (C6-C30) aryl, (C2-C20) alkenyl and (C6-C30) ar (C1-C20) alkyl;

$R^1$ to $R^4$ and $R^{22}$ and $R^{23}$ are each independently hydrogen atom, (C1-C20) alkyl, (C3-C20) cycloalkyl, (C6-C30) aryl, (C6-C30) ar (C1- C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio or nitro, or the adjacent $R^1$ to $R^4$ optionally form an aliphatic ring, and monocyclic or polycyclic aromatic ring;

$X^1$ and $X^2$ are each independently halogen atom, (C1-C20) alkyl, (C3-C20) cycloalkyl, (C6-C30) ar (C1-C20) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) artylthio, or

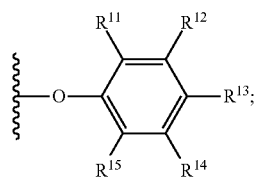

$R^{11}$ to $R^{15}$ are each independently hydrogen atom, halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio or nitro, or the adjacent $R^{11}$ to $R^{15}$ optionally form an aliphatic ring, and monocyclic or polycyclic aromatic ring; and alkyl, aryl, cycloalkyl, aralkyl, alkoxy, alkylsiloxy, arylsiloxy, alkylamino, arylamino, alkylthio, arylthio of the $R^1$ to $R^4$, $R^{11}$ to $R^{15}$, $R^{22}$ and $R^{23}$, and $X^1$ and $X^2$; the rings optionally formed by binding adjacent $R^1$ to $R^4$ or adjacent $R^{11}$ to $R^{15}$ are optionally further substituted with at least one selected from the group consisting of halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio, nitro and hydroxy.

2. The method according to claim 1, wherein M in the transition metal catalyst represented by the above Formula 1 is Ti, Zr or Hf.

3. The method according to claim 1, wherein the transition metal catalyst is selected from the group consisting of the following Formulae:

[Formula 1-2]

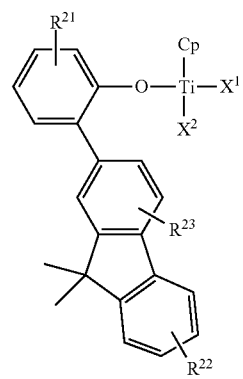

[Formula 1-7]

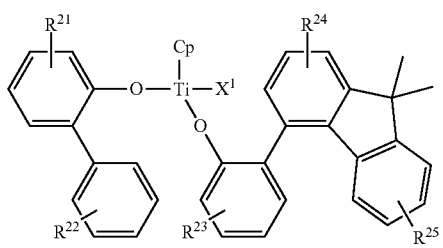

[Formula 1-8]

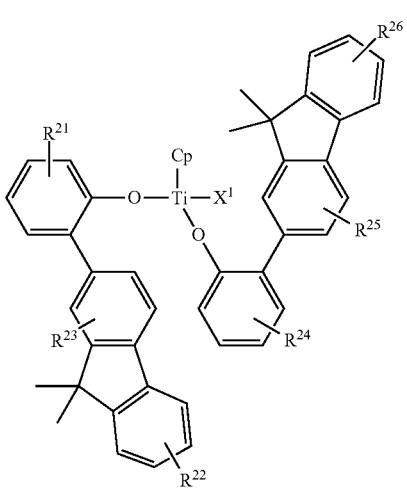

-continued

[Formula 1-11]

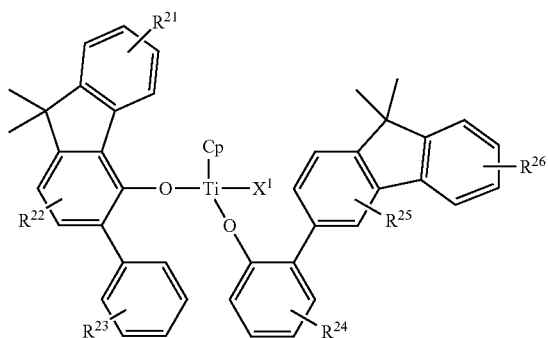

where

R²¹ to R²⁶ are each independently hydrogen atom, halogen atom, (C1-C20) alkyl, (C3-C20) cycloalkyl, (C6-C30) aryl, (C6-C30) ar (C1-C10) alkyl, (C1-C20) alkoxy, (C3-C20) alkylsiloxy, (C6-C30) arylsiloxy, (C1-C20) alkylamino, (C6-C30) arylamino, (C1-C20) alkylthio, (C6-C30) arylthio or nitro, or the adjacent R²¹ to R²⁶ optionally form an aliphatic ring, and monocyclic or polycyclic aromatic ring; alkyl, aryl, cycloalkyl, aralkyl, alkoxy, alkylsiloxy, arylsiloxy, alkylamino, arylamino, alkylthio, arylthio of the R²¹ to R²⁶ are optionally further substituted with at least one selected from the group consisting of halogen atom, (C1-C20) alkyl, (C3-C20) cycloalkyl, (C6-C30) aryl, (C6-C30) ar (C1- C10) alkyl, (C1-C20) alkoxy, (C3-C20) alkylsiloxy, (C6-C30) aryl-siloxy, (C1-C20) alkylamino, (C6-C30) arylamino, (C1-C20) alkylthio, (C6-C30) arylthio, nitro and hydroxy;

Cp is a cyclopentadienyl ring, or a cyclopentadienyl containing fused ring that can form an η 5 -bond along with a central metal, Ti, and the cyclopentadienyl ring or the cyclopentadienyl containing fused ring is optionally further substituted with at least one selected from the group consisting of (C1-C20) alkyl, (C6-C30) aryl, (C2-C20) alkenyl and (C6-C30) ar (C1-C20) alkyl; and X¹ and X² are methyl or Cl.

4. The method according to claim 1, wherein the transition metal catalyst is selected from the group consisting of the following Formulae:

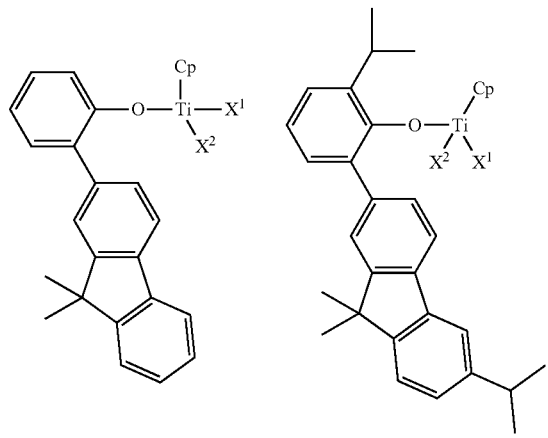

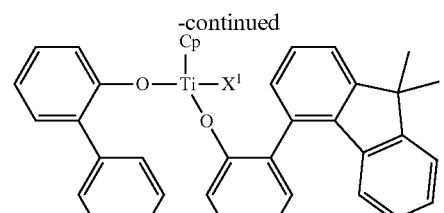

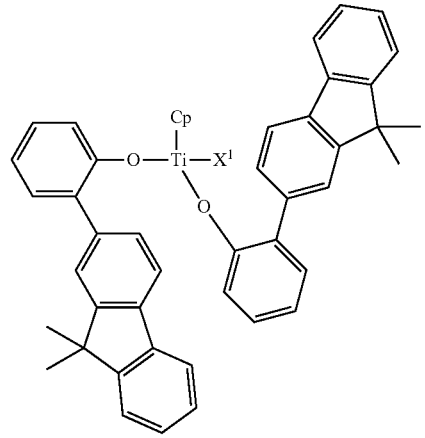

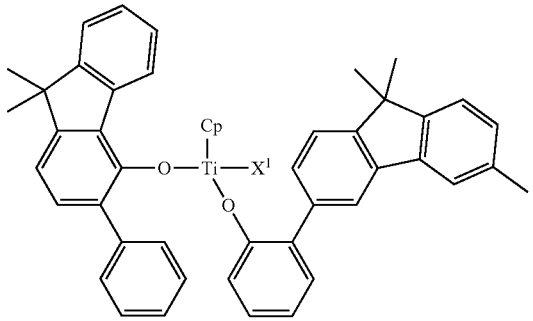

where
Cp is a cyclopentadienyl ring, or a cyclopentadienyl containing fused ring that can form an η 5 -bond along with a central metal, M, and the cyclopentadienyl ring or the cyclopentadienyl containing fused ring is optionally further substituted with at least one selected from the group consisting of (C1-C20) alkyl, (C6-C30) aryl, (C2-C20) alkenyl and (C6-C30) ar (C1-C20) alkyl; and X¹ and X² are methyl or Cl.

5. The method according to claim 1, wherein the transition metal catalyst is at least one selected from the group consisting of (dichloro)(pentamethylcyclopentadienyl)(2-(9,9'-dimethylfluorene-2'-yl)phenoxy)titanium(IV) and (chloro)(pentamethylcyclopentadienyl)(bis(2-(9,9'-dimethylfluorene-2'-yl)phenoxy))titanium(IV).

6. The method according to claim 1, wherein the pressure of the reaction is 1 to 500 atm and the temperature of the polymerization is 30 to 300° C.

7. The method according to claim 1, wherein the catalyst composition includes the transition metal catalyst; and a cocatalyst selected from the group consisting of aluminoxane compound, alkylaluminum compound, boron compound, and the combination thereof.

8. The method according to claim 7, wherein the ratio of the transition metal catalyst and the cocatalyst is 1:0.1 to 50:1 to 1000 based on the mole ratio of transition metal M:boron atom:aluminum atom.

9. The method according to claim 1, wherein the organic solvent is at least one selected from the group consisting of butane, isobutane, pentane, hexane, heptane, octane, isooctane, nonane, decane, dodecane, cyclohexane, methylcyclohexane, benzene, toluene and xylene.

10. The method according to claim 1, wherein the copolymer of ethylene, propylene, and styrene has 60,000 to 600,000 of a weight average molecular weight and 1.0 to 5.0 of a molecular weight distribution Mw/Mn.

* * * * *